United States Patent
Kasahara et al.

(10) Patent No.: US 9,280,036 B2
(45) Date of Patent: Mar. 8, 2016

(54) LIGHTING DEVICE, IMAGE CAPTURING SYSTEM, AND LIGHTING CONTROL METHOD

(71) Applicant: PFU Limited, Kahoku-shi, Ishikawa (JP)

(72) Inventors: Yuki Kasahara, Ishikawa (JP); Jian Li, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/183,185

(22) Filed: Feb. 18, 2014

(65) Prior Publication Data

US 2015/0117849 A1     Apr. 30, 2015

(30) Foreign Application Priority Data

Oct. 31, 2013 (JP) .................................. 2013-226935

(51) Int. Cl.
 G03B 15/03  (2006.01)
 G03B 15/02  (2006.01)

(52) U.S. Cl.
 CPC ................ *G03B 15/03* (2013.01); *G03B 15/02* (2013.01)

(58) Field of Classification Search
 USPC ........................................................ 396/164
 See application file for complete search history.

(56) References Cited

U.S. PATENT DOCUMENTS

| | | | |
|---|---|---|---|
| 5,084,611 A * | 1/1992 | Okisu et al. ............... | 250/208.1 |
| 5,444,486 A | 8/1995 | Mizuno et al. | |
| 5,594,502 A | 1/1997 | Bito et al. | |
| 5,978,028 A | 11/1999 | Yamane | |
| 6,317,155 B1 | 11/2001 | Ohyama | |
| 6,540,415 B1 | 4/2003 | Slatter et al. | |
| 7,626,634 B2 * | 12/2009 | Ohki et al. ............... | 348/373 |
| 8,553,090 B2 | 10/2013 | Shiu et al. | |
| 8,559,063 B1 | 10/2013 | Booppanon et al. | |
| 8,767,056 B2 | 7/2014 | Carpenter | |
| 8,781,311 B1 | 7/2014 | Hatzav et al. | |

(Continued)

FOREIGN PATENT DOCUMENTS

| | | |
|---|---|---|
| JP | 07-236081 | 9/1995 |
| JP | 7-298130 A | 11/1995 |

(Continued)

OTHER PUBLICATIONS

Notice of Rejection Japanese Patent Application No. 2013-226935 dated Jul. 29, 2014 with full English translation.

(Continued)

*Primary Examiner* — Clayton E Laballe
*Assistant Examiner* — Linda B Smith
(74) *Attorney, Agent, or Firm* — McDermott Will & Emery LLP

(57) ABSTRACT

A lighting device includes a base unit arranged on a medium installation face on which a medium is disposed, an arm unit extending upwardly from the base unit, a top unit extending from the arm unit so as to face the medium installation face, a mounting face disposed on the top unit to mount an image capturing unit at a position capable of photographing the medium on the medium installation face, a lighting disposed in the top unit to irradiate the medium installation face, and a lighting control unit configured to adjust an amount of light of the lighting. The lighting control unit sets the amount of light of the lighting to a maximum at the time of photographing and, after the photographing, returns the amount of light to that before the photographing.

4 Claims, 9 Drawing Sheets

(56) References Cited

U.S. PATENT DOCUMENTS

| | | | |
|---|---|---|---|
| D714,775 S | 10/2014 | Yoo et al. | |
| 2003/0025951 A1 | 2/2003 | Pollard et al. | |
| 2003/0081014 A1 | 5/2003 | Frohlich | |
| 2004/0233325 A1 | 11/2004 | Lee et al. | |
| 2005/0040298 A1 | 2/2005 | Ohki et al. | |
| 2005/0088543 A1 | 4/2005 | Yoshii | |
| 2005/0168627 A1 | 8/2005 | Yi et al. | |
| 2005/0174473 A1* | 8/2005 | Morgan et al. | 348/370 |
| 2006/0045379 A1 | 3/2006 | Heaney et al. | |
| 2006/0077286 A1 | 4/2006 | Wenderski | |
| 2006/0110152 A1 | 5/2006 | Sukenari et al. | |
| 2007/0035655 A1 | 2/2007 | Chen et al. | |
| 2007/0188830 A1 | 8/2007 | Watanuki | |
| 2007/0213590 A1* | 9/2007 | Squicciarini | 600/172 |
| 2008/0062263 A1 | 3/2008 | Shiu et al. | |
| 2009/0002548 A1* | 1/2009 | Liang et al. | 348/373 |
| 2009/0202236 A1* | 8/2009 | Hama et al. | 396/180 |
| 2010/0321561 A1 | 12/2010 | Duncan et al. | |
| 2011/0157376 A1 | 6/2011 | Lyu et al. | |
| 2011/0288964 A1 | 11/2011 | Linder et al. | |
| 2012/0169888 A1 | 7/2012 | Clark | |
| 2012/0230056 A1* | 9/2012 | Hanaoka et al. | 362/612 |
| 2012/0320262 A1* | 12/2012 | Chung | 348/370 |
| 2014/0037296 A1* | 2/2014 | Yamada et al. | 398/128 |
| 2014/0055990 A1* | 2/2014 | Reed | 362/218 |
| 2014/0160345 A1 | 6/2014 | Takabatake et al. | |
| 2014/0160350 A1 | 6/2014 | Takabatake et al. | |
| 2014/0168506 A1 | 6/2014 | Kasahara | |
| 2015/0117849 A1 | 4/2015 | Kasahara et al. | |
| 2015/0138432 A1 | 5/2015 | Takabatake et al. | |
| 2015/0181072 A1 | 6/2015 | Kasahara et al. | |

FOREIGN PATENT DOCUMENTS

| | | |
|---|---|---|
| JP | 08-9318 A | 1/1996 |
| JP | 9-284634 A | 10/1997 |
| JP | 2005-99708 | 4/2005 |
| JP | 2005-141185 A | 6/2005 |
| JP | 2006-235498 A | 9/2006 |
| JP | 2007-101663 A | 4/2007 |
| JP | 2012-124582 A | 6/2012 |
| WO | 2013111278 A1 | 8/2013 |

OTHER PUBLICATIONS

Non-Final Office Action U.S. Appl. No. 14/072,558 dated Dec. 5, 2014.

Non-Final Office Action U.S. Appl. No. 14/072,655 dated Dec. 5, 2014.

Non-Final Office Action U.S. Appl. No. 14/072,612 dated Aug. 19, 2015.

Final Office Action Japanese Patent Application No. 14/072,558 dated Jun. 15, 2015.

Final Office Action U.S. Appl. No. 14/072,655 dated Jun. 15, 2015.

Kazuhiro Ikeda et al., "Reading Lamp that can Scan Books: LED Desk Lamp with Internal Camera", http://gadget.itmedia.co.jp/gg/articles/1201/20/nes127.html. Jan. 20, 2012, with English translation.

* cited by examiner

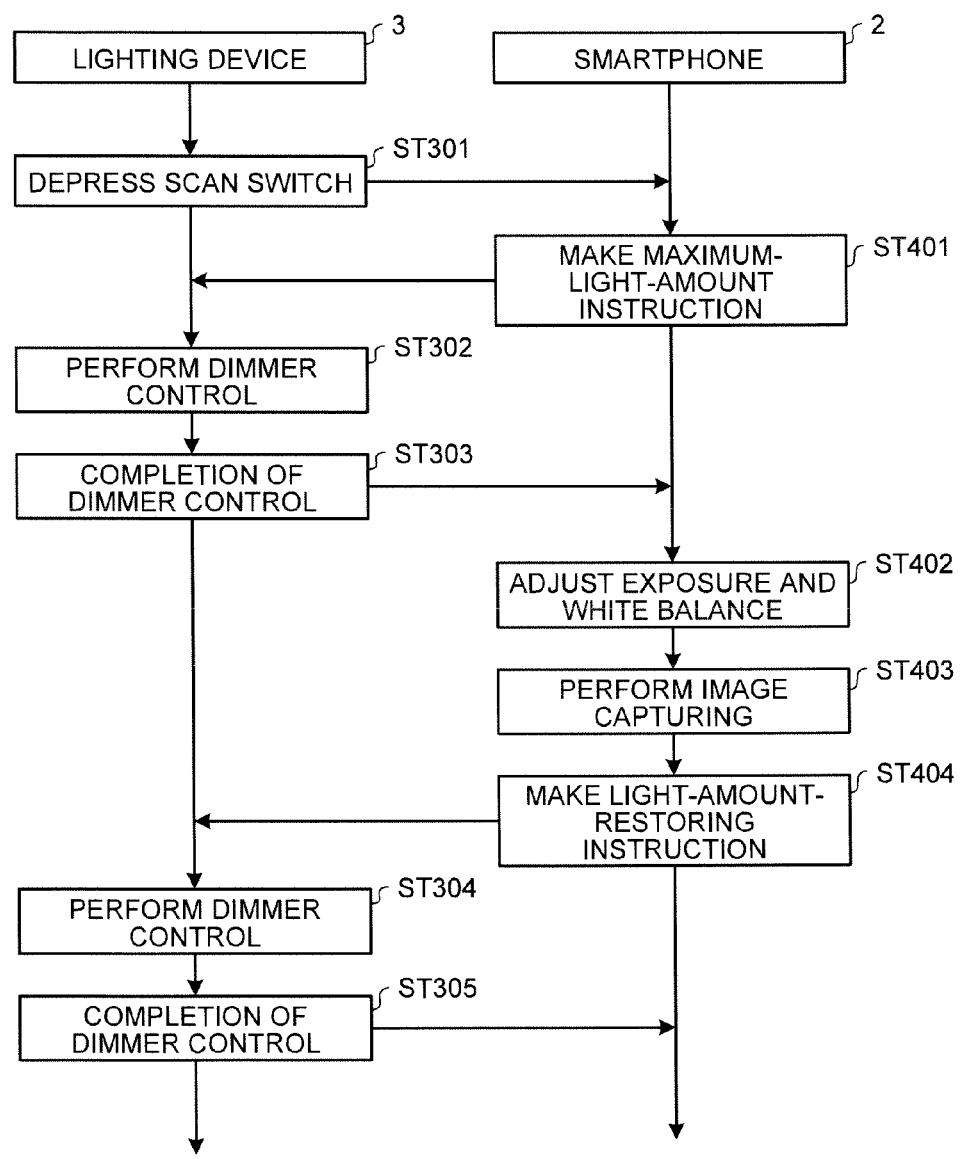

LIGHTING DEVICE, IMAGE CAPTURING SYSTEM, AND LIGHTING CONTROL METHOD

CROSS-REFERENCE TO RELATED APPLICATIONS

This application is based upon and claims the benefit of priority from Japanese Patent Application No. 2013-226935, filed Oct. 31, 2013, the entire contents of which are incorporated herein by reference.

BACKGROUND OF THE INVENTION

1. Field of the Invention

The present invention relates to a lighting device, an image capturing system, and a lighting control method.

2. Description of the Related Art

When capturing an image of, i.e. photographing an object using a camera, there are many cases where the object is photographed using not only natural light but also light emitted from a lighting device such as a fluorescent lamp or LEDs. However, when photographing the object using the light emitted from the lighting device, there are cases where a flicker noise is generated in a photographed image due to flicker of the emission light by using an AC power supply as the power supply. Thus, among conventional image capturing apparatuses, there are apparatuses that eliminate flicker by integrating an image while changing shutter speed or a gain value (for example, Japanese Laid-open Patent Publication No. 7-298130) or by detecting a flicker frequency and performing control of the shutter speed to be higher than the detected flicker frequency (for example, Japanese Laid-open Patent Publication No. 9-284634).

Generally, in a lighting device, the amount of light is adjusted such that the light is emitted with a brightness level preferred by a user using the light emitted from the lighting device. However, the brightness level at this amount of the light may be different from a brightness level that is appropriate to a photographing process performed by a camera. Accordingly, in the case of photographing an image by a camera using light emitted from a lighting device, acquisition of an appropriate image is apt to become difficult. Consequently, it is quite difficult to acquire a function as a lighting device where light is emitted with a brightness level preferred by the user, while acquiring an appropriate image where light is emitted with a brightness level that is appropriate to the photographing process performed in the camera.

SUMMARY OF THE INVENTION

It is an object of the present invention to at least partially solve the problems in the conventional technology, and to provide a lighting device, an image capturing system, and a lighting control method capable of acquiring an optimal image at the time of capturing an image and maintaining the function as a lighting device at the other time.

According to an aspect of the present invention, a lighting device comprises a base unit arranged on a medium installation face on which a medium that is a reading target is disposed, an arm unit extending upwardly from the base unit, a top unit extending from the arm unit so as to face the medium installation face, a mounting face disposed on the top unit to mount an image capturing unit at a position capable of photographing the medium disposed on the medium installation face, a lighting disposed in the top unit to irradiate the medium installation face, and a lighting control unit configured to perform driving control to adjust an amount of light of the lighting, wherein the lighting control unit is configured to set the amount of light of the lighting to a maximum at the time of photographing and, after the photographing, return the amount of light of the lighting to the amount of light before the photographing.

According to further aspect of the present invention, an image capturing system comprises a lighting device which includes a base unit arranged on a medium installation face on which a medium that is a reading target is disposed, an arm unit extending upwardly from the base unit, a top unit extending from the arm unit so as to face the medium installation face, a mounting face that is disposed on the top unit to mount an image capturing unit at a position capable of photographing the medium disposed on the medium installation face, a lighting disposed in the top unit to irradiate the medium installation face, and a lighting control unit configured to perform driving control to adjust an amount of light of the lighting, wherein the lighting control unit is configured to set the amount of light of the lighting to a maximum at the time of photographing and, after the photographing, return the amount of light of the lighting to the amount of light before the photographing, and an image capturing unit configured to photograph the medium.

According to still further aspect of the present invention, in a method of controlling lighting of a lighting device including a base unit arranged on a medium installation face on which a medium that is a reading target is disposed, an arm unit extending upwardly from the base unit, a top unit extending from the arm unit so as to face the medium installation face, a mounting face disposed on the top unit to mount an image capturing unit at a position capable of photographing the medium disposed on the medium installation face, and a lighting disposed in the top unit to irradiate the medium installation face, the method comprises irradiating the medium installation face with an amount of light of the lighting, setting the amount of light of the lighting to a maximum at the time of photographing; and after the photographing, returning the amount of light of the lighting to the amount of light before the photographing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a control transition diagram between the lighting device and the smartphone at the time of scanning a medium.

DETAILED DESCRIPTION OF THE PREFERRED EMBODIMENTS

Hereinafter, a lighting device, an image capturing system, and a light control method according to an embodiment of the present invention will be described in detail with reference to the drawings. However, the present invention is not limited to such an embodiment. In addition, in constituent elements of the embodiment described below, elements with which the constituent elements can be easily replaced by those skilled in the art or elements that are substantially the same as the constituent element are included.

Embodiment

Figure 1:
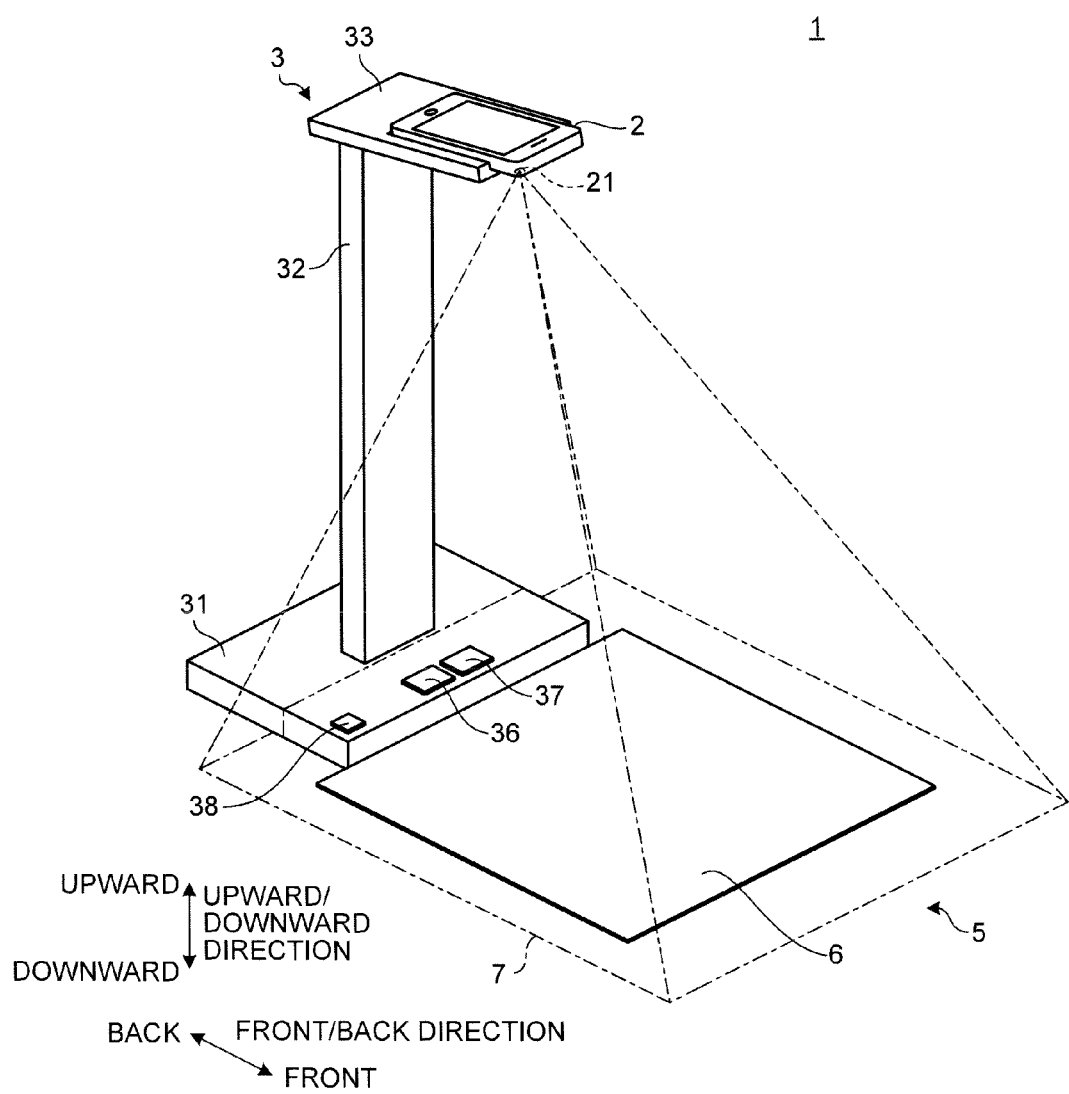
FIG. 1 is a perspective view that illustrates a schematic configuration of an image capturing system according to an embodiment.
Figure 2:
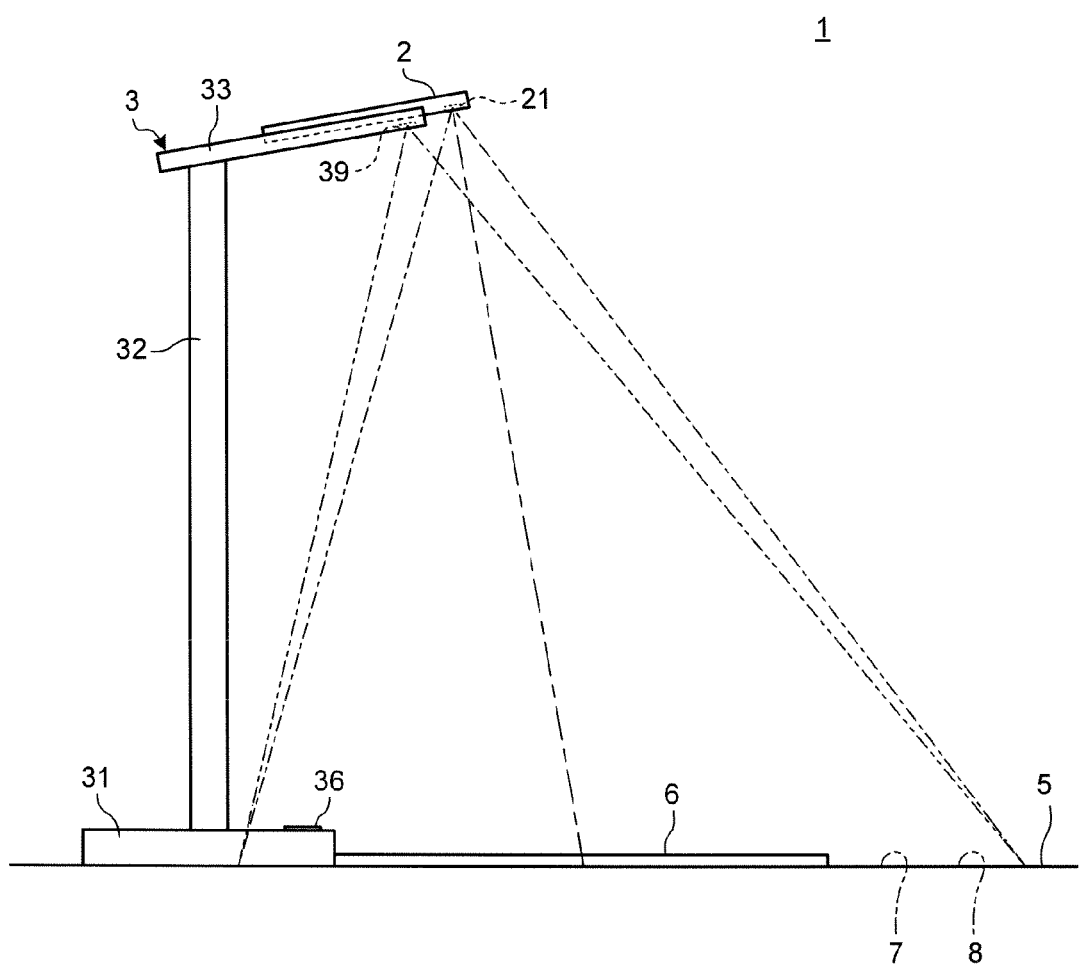
FIG. 2 is a side view of the image capturing system illustrated in FIG. 1.
Figure 3:
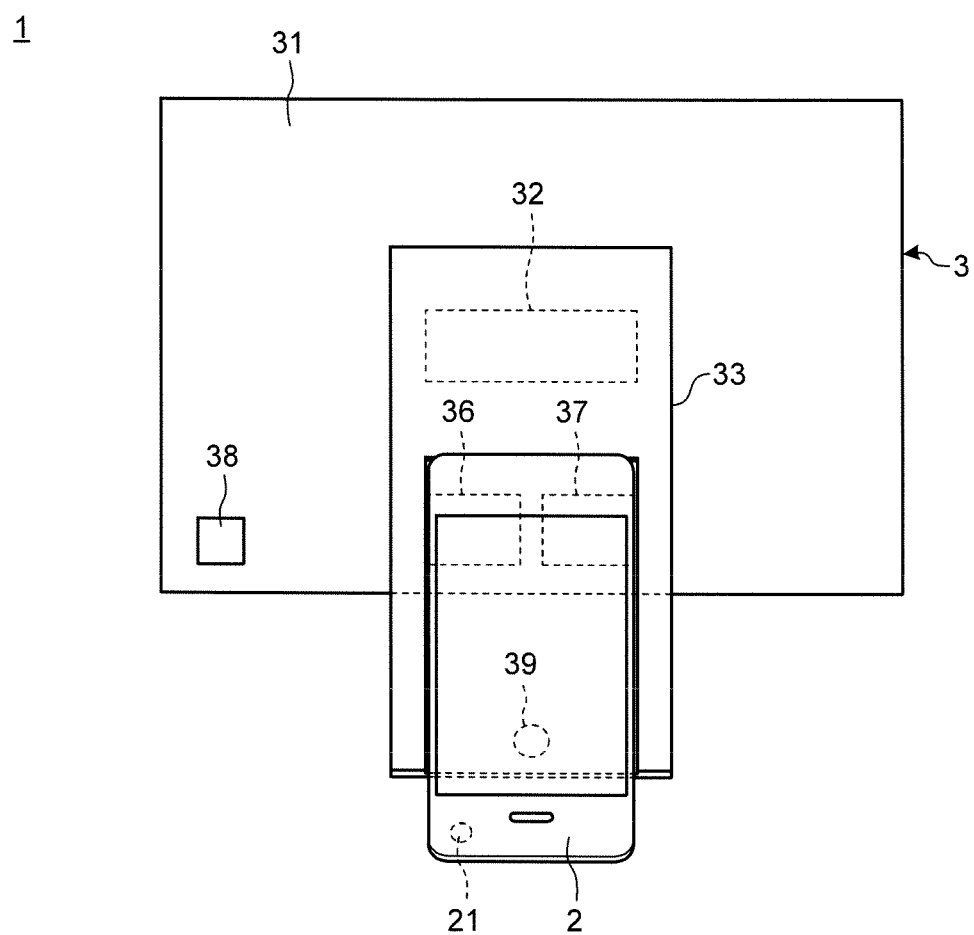
FIG. 3 is a plan view of the image capturing system illustrated in FIG. 1.

FIG. 1 is a perspective view that illustrates a schematic configuration of an image capturing system according to an embodiment. FIG. 2 is a side view of the image capturing system illustrated in FIG. 1. FIG. 3 is a plan view of the image capturing system illustrated in FIG. 1. An image capturing system 1 illustrated in FIGS. 1 to 3 is a scanner system that performs a scanning operation of generating image data of a medium 6 by photographing the medium 6 that is a reading target disposed on a medium installation face 5 from the upper side by a predetermined image capturing unit. In this embodiment, as an example of the image capturing unit, a smartphone 2 having a camera function will be described.

The image capturing system 1 according to this embodiment is equipped with a smartphone 2 and a lighting device 3 that can mount the smartphone 2 at the time of scanning by performing photographing using the smartphone 2. When the smartphone 2 is mounted at a predetermined position (on a mounting face 34 to be described later) of the lighting device 3, the image capturing system 1 can position the smartphone 2 precisely and can acquire a scan image of a predetermined area 7 to be photographed (hereinafter, photographed area 7) using the smartphone 2. In the description presented below, the upward/downward direction in FIG. 1 will be described as the upward/downward direction of the image capturing system 1 and the lighting device 3, the front side in FIG. 1 will be described as the front direction of the image capturing system 1 and the lighting device 3, and the rear side in FIG. 1 will be described as the back direction of the image capturing system 1 and the lighting device 3. That is, with respect to the image capturing system 1, specifically, with respect to a base 31, as disclosed in FIG. 1, a side facing the medium 6 is defined as the front side of the image capturing system 1 and the lighting device 3, and an opposite side to the front side is defined as the back side of the image capturing system 1 and the lighting device 3. A direction from the back side of the image capturing system 1 toward the front side of the image capturing system is defined as a front direction, and a direction opposite to the front direction is defined as a back direction.

On the rear face of the smartphone 2, an image capturing unit 21 performing a camera function is disposed. The image capturing unit 21 can perform a scanning operation (here, "scanning operation" means photographing a predetermined photographed area 7, as described in the specification later) in accordance with an operation instruction transmitted from a CPU 25 (FIG. 5) of the smartphone 2. In a state in which the smartphone 2 is mounted on the mounting face 34 of the lighting device 3, the image capturing unit 21 can photograph the entirety of a predetermined photographed area 7 and generate a scanned image (i.e., a photographed image) including the entirety of the photographed area 7.

The lighting device 3 is equipped with three members of a base unit 31, an arm unit 32, and a top unit 33. Among these, the base unit 31 is arranged on the medium installation face 5. The arm unit 32 is connected to the upper face of the base unit 31 and upwardly extends from the base unit 31. Here, the extending direction of the arm unit 32, as illustrated in FIGS. 1 to 3, may be a vertically upward direction or a direction inclined to the front side (the side on which the medium 6 is disposed) or the back side (a side opposite to the side on which the medium 6 is disposed) from the vertically upward direction.

The top unit 33 is connected to the arm unit 32 and extends from the arm unit 32 so as to face the medium installation face 5. In this embodiment, as illustrated in FIG. 2, the top unit 33 is connected to an upper end portion of the arm unit 32, extends to the front side at a position of a height at which the arm unit 32 is connected, and extends toward the upward inclination from the horizontal direction.

The base unit 31, the arm unit 32, and the top unit 33 of the lighting device 3 are integrally fixed. In other words, a connection portion between the base unit 31 and the arm unit 32 and a connection portion between the arm unit 32 and the top unit 33 are fixedly disposed so as not to be deformed such as being rotated, detached/attached, or moved.

Figure 4:
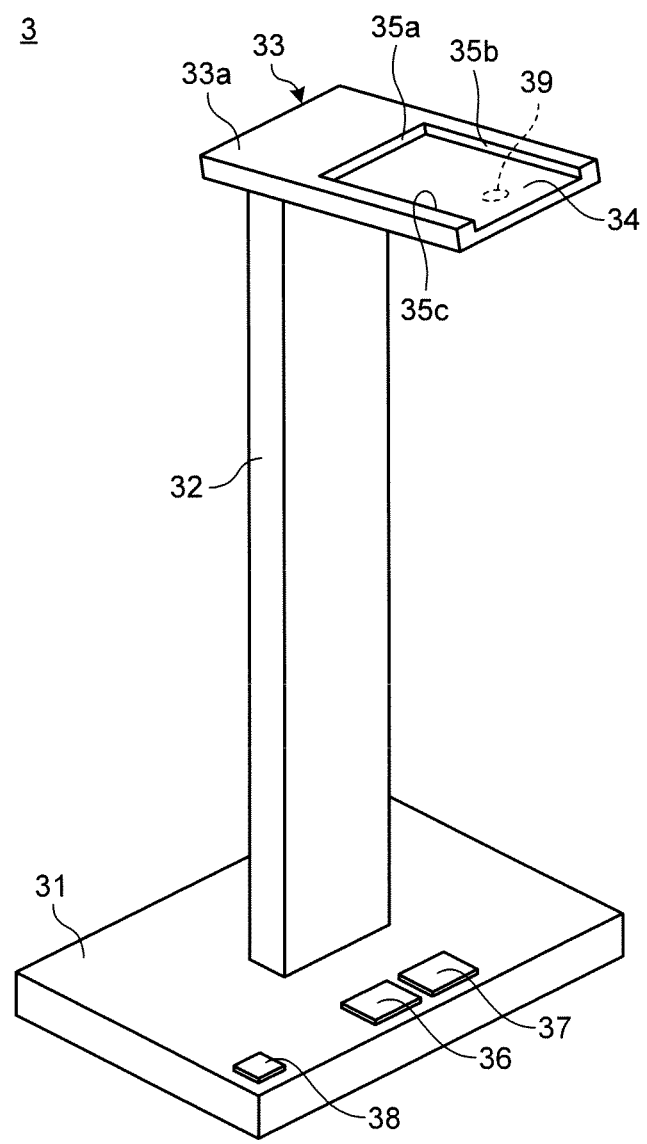
FIG. 4 is a perspective view of a lighting device illustrated in FIG. 1.

FIG. 4 is a perspective view of the lighting device illustrated in FIG. 1. On an upper face 33a of the top unit 33 of the lighting device 3, a mounting face 34 that is used for mounting the smartphone 2 is disposed at a position where the smartphone 2 can photograph the medium 6 disposed on the medium installation face 5.

The mounting face 34 is formed by being recessed from the upper face 33a of the top unit 33. The placement surface 34 is formed 33a. The mounting face 34 is disposed such that a part of rear face of the smartphone 2 in the longitudinal direction thereof protrudes from the distal end of the top unit 33 when the smartphone 2 is mounted. In other words, the mounting face 34 is formed from the front end of the top unit 33 over the rear side (the direction of the arm unit 32) thereof, and the area of the mounting face 34 is smaller than the area of the rear face of the smartphone 2. In addition, the length of the mounting face 34 in the front/back direction is shorter than the length of the smartphone 2 in the longitudinal direction. Accordingly, the smartphone 2 can be mounted on the mounting face 34 with the image capturing unit 21 disposed on the rear face of the smartphone 2 not being hidden by the mounting face 34. In other words, when the smartphone 2 is mounted on the mounting face 34, the image capturing unit 21 is positioned so as to directly face the medium installation face 5, and accordingly, the image capturing unit 21 can image the medium 6 disposed on the medium installation face 5. In addition, by forming the mounting face 34 as such, smooth mounting and dismounting of the smartphone 2 is available.

Between the upper face 33a of the top unit 33 and the mounting face 34, steps or steps are formed. More specifically, a step 35a that is brought into contact with the lower portion of the smartphone 2 in the longitudinal direction and steps 35b and 35c that are brought into contact with right and left side faces of the smartphone 2. Namely, the steps 35a, 35b, and 35c are provided so as to abut the smartphone 2 from three directions. The steps 35a and 35b are connected at an approximately right angle, the steps 35a and 35c are connected at an approximately right angle, and the steps 35b and 35c are arranged in parallel with the front/back direction. By bringing such steps 35a, 35b, and 35c into contact with the smartphone 2, the position of the smartphone 2 can be determined to be a predetermined position. In other words, the steps 35a, 35b, and 35c formed between the upper face 33a of the top unit 33 and the mounting face 34 serve as a positioning unit that is used for positioning the smartphone 2 at a predetermined position on the mounting face 34.

Thus, when the smartphone 2 is mounted on the mounting face 34, by only causing the lower portion of the smartphone 2 in the longitudinal direction to abut against the step 35a, the smartphone 2 can be mounted by being easily positioned at a predetermined position on the mounting face 34. In addition, as described above, since the top unit 33 is inclined, the mounting face 34 is disposed to be inclined in the downward direction with respect to the horizontal direction from the front side to the rear side of the top unit 33. Accordingly, it is easy to cause the smartphone 2 to abut against the step 35a.

The installation position of the mounting face 34 is set such that there is a distance between the image capturing unit 21 of the smartphone 2 and the medium installation face 5 to some degree for which the entirety of a predetermined photographed area 7 disposed on the lower side can be imaged when the smartphone 2 is mounted on the mounting face 34. Described in more detail, the mounting face 34 is configured such that, when the smartphone 2 is mounted on the mounting face 34, the photographed area 7 of the smartphone 2 includes an area in which the medium 6, which neighbors to the front side of the base unit 31 of the lighting device 3, is arranged and a front-side upper face portion of the base unit 31.

In addition, on the upper face of the base unit 31 of the lighting device 3, a scan switch 36, a lighting switch 37, and a power switch 38 are disposed. Furthermore, on the lower face of the top unit 33 of the lighting device 3 that faces the medium installation face 5, a lighting light emitting diode (LED) 39 is disposed. The scan switch 36, the lighting switch 37, the power switch 38, and the lighting LED 39 are electrically connected to a control unit 40 (see FIG. 5) that is equipped inside the lighting device 3. Such switches may be disposed at positions other than on the top face of the base unit 31. For example, the power switch 38 may be disposed on the rear face of the base unit 31. In addition, instead of disposing the power switch 38 in the lighting device 3, the lighting device 3 may be turned on/off by plugging or unplugging a plug-in plug included in the lighting device 3 into a plug socket.

The scan switch 36 is an input unit that receives an instruction of a scan manipulation that causes the smartphone 2 to perform a scanning operation from the user. In addition, the lighting switch 37 is an input unit that is used for switching over On and Off of the lighting LED 39 and for adjusting the amount of light emitted from the lighting LED 39. In addition, the power switch 38 is a switch that switches over conduction and non-conduction between an external power supply 50 (see FIG. 5) and the lighting device 3. In addition, the lighting LED 39 is arranged on the lower face of the top unit 33 such that an emission range 8 at the time of emission is substantially the same as the photographed area 7 of the smartphone 2, and the photographed area 7 can be evenly lighted.

Figure 5:
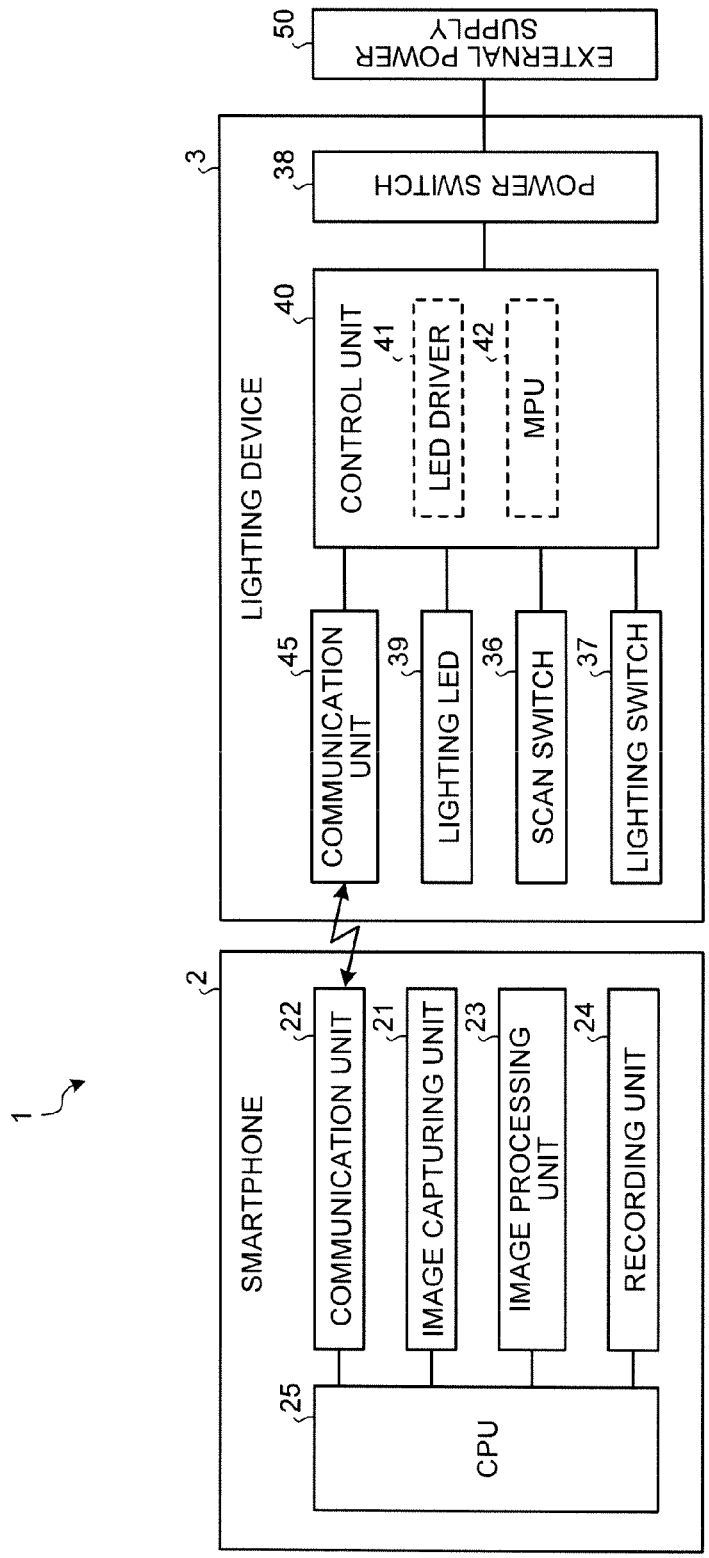
FIG. 5 is a functional block diagram of the image capturing system illustrated in FIG. 1.

FIG. 5 is a functional block diagram of the image capturing system illustrated in FIG. 1. The smartphone 2 configuring the image capturing system 1 together with the lighting device 3 is equipped with the image capturing unit 21, a communication unit 22, an image processing unit 23, a recording unit 24, and a central processing unit (CPU) 25. The image capturing unit 21, the communication unit 22, the image processing unit 23, and the recording unit 24 are electrically connected to the CPU 25.

The communication unit 22 is configured to be capable of communicating with the lighting device 3 and, for example, performs wireless communication using the Bluetooth (registered trademark). The communication with the lighting device 3 may be performed using a technique other than the Bluetooth, and any technique such as the near field communication (NFC) or the infrared communication that is capable of performing communication between the smartphone 2 mounted on the mounting face 34 and the lighting device 3 may be used.

The image processing unit 23 is a part that performs arbitrary image processing for an image photographed by the image capturing unit 21. The image processing unit 23, for example, performs image processing for the image of the medium 6 that is photographed by the image capturing unit 21 of the smartphone 2 mounted on the inclined mounting face 34 of the top unit 33 from the upper side of the inclination of the medium 6 disposed on the medium installation face 5 to be an image acquired by photographing the medium 6 from the upper side in the vertical direction. The recording unit 24 is a storage device that stores read data acquired by the image capturing unit 21 and image data acquired by performing image processing using the image processing unit 23. The CPU 25 performs various calculation processes at the time of communication with the lighting device 3 in the communication unit 22, at the time of a photographing process performed by the image capturing unit 21, at the time of image processing performed by the image processing unit 23, and the like.

On the other hand, the lighting device 3 is equipped with a communication unit 45, a lighting LED 39, a scan switch 36, a lighting switch 37, a power switch 38, and a control unit 40. The communication unit 45, the lighting LED 39, the scan switch 36, the lighting switch 37, and the power switch 38 are electrically connected to the control unit 40.

The communication unit 45 is configured to be communicable with the communication unit 22 of the smartphone 2 using the Bluetooth or the like. The smartphone 2 and the lighting device 3 can communicate with each other through wireless communication using the communication units 22 and 45 thereof.

The control unit 40 includes an LED driver 41 and a micro processing unit (MPU) 42. Of these, the LED driver 41 is configured to cause the lighting LED 39 to emit light and adjust the amount of light at the time of light emission. Accordingly, the control unit 40 including the LED driver 41 is arranged also as a lighting control unit that performs driving control for adjusting the amount of light of the lighting LED 39. In addition, the MPU 42 transmits a control signal to the LED driver 41 or the communication unit 45 in accordance with an input manipulation that is input to the scan switch 36 or the lighting switch 37, thereby being capable of performing control of the light emission of the lighting LED 39 or control of the communication between the lighting device 3 and the smartphone 2.

In addition, the power switch 38 is interposed between the control unit 40 and the external power supply 50 and can switch over the operation and the stop of the lighting device 3 by performing switching over conduction (On) and non-conduction (Off) between the control unit 40 and the external power supply 50 in accordance with an input manipulation.

The image capturing system 1 according to this embodiment is configured as described above, and, hereinafter, the operation thereof will be described. Generally, the lighting device 3 configuring the image capturing system 1 is used in a lighting stand. When the lighting device 3 is used as the lighting stand, the lighting switch 37 is depressed for a short time with the power switch 38 being in the On state. An input to this lighting switch 37 may be other than a strong depression and thus may be a tap on the lighting switch 37 or a contact (touch) with the lighting switch 37 according to the form of the lighting switch 37. The MPU 42 that has detected a press on the lighting switch 37 turns on the lighting LED 39 through the LED driver 41. Accordingly, the lighting LED 39 emits light for the emission range 8, and the lighting device 3 can light the lower side of the top unit 33 using the light emitted from the lighting LED 39. When the lighting LED 39 that is in the turn-on state is turned off, the lighting switch 37 is depressed for a short time in a state in which the lighting LED 39 is turned on. As a result, the MPU 42 turns off the lighting LED 39 through the LED driver 41.

In addition, by depressing the lighting switch 37 for a long time by continuously depressing the lighting switch 37 for a predetermined time or longer in the state in which the lighting LED 39 is turned on, the lighting device 3 can perform dimmer control. In a case where the lighting switch 37 is in a form in which an input is made through a touch, the dimmer control can be performed by continuously touching the lighting switch 37 for a predetermined time or more. Described in more detail, in the state in which the lighting LED 39 is turned on, when the lighting switch 37 is depressed for a long time, the lighting LED 39 repeats increasing and decreasing the amount of light thereof, and, when a user using the lighting device 3 separates his finger from the lighting switch 37 at a time point at which the brightness level is preferred by the user, the lighting LED 39 is continued to be turned on with the brightness level being maintained.

In other words, when the MPU 42 detects that the lighting switch 37 is depressed longer than a predetermined time in the state in which the lighting LED 39 is turned on, the MPU 42 performs driving control for adjusting the amount of light of the lighting LED 39 through the LED driver 41 such that the increasing and decreasing of the amount of light is repeated while the lighting switch 37 is depressed. In this dimmer control state, when the MPU 42 detects that the lighting switch 37 is not depressed, the MPU 42 performs driving control for adjusting the amount of light of the lighting LED 39 through the LED driver 41 so as to maintain the amount of light at that time point. As above, when the amount of light of the lighting LED 39 is adjusted, the control unit 40 adjusts the amount of light through pulse width modulation (PWM) control.

Figure 6:
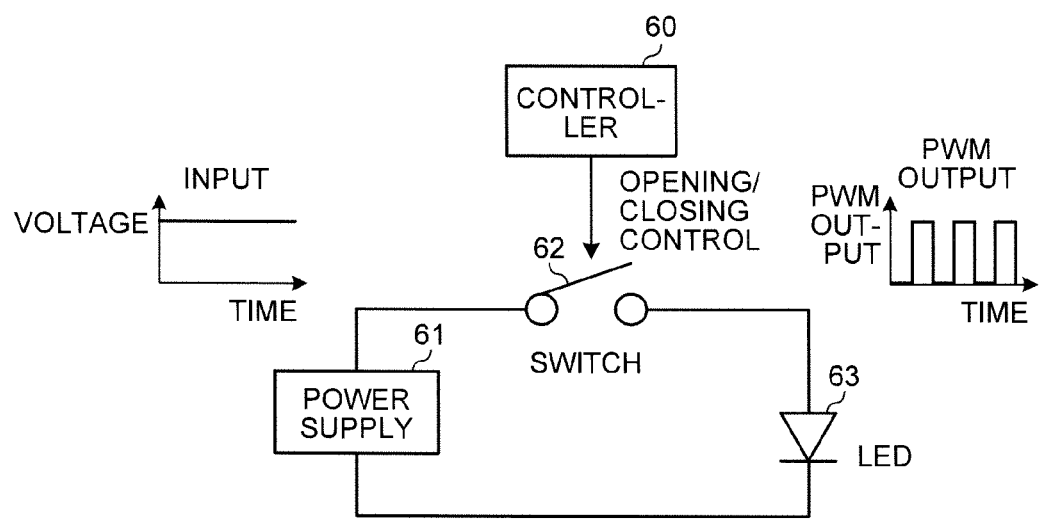
FIG. 6 is a schematic diagram that illustrates a PWM control process.

FIG. 6 is a schematic diagram that illustrates the PWM control process. The PWM control process that is used for controlling the amount of light of the lighting LED 39 will be described with reference to FIG. 6. In the PWM control process, a method is used in which the amount of light is intermittently held down by opening and closing a circuit between an LED 63, which is a light source, and a power supply 61, which is the driving source of the LED 63, at high speed. The opening and closing of the circuit at that time is performed by opening and closing a switch 62 disposed in the circuit using a controller 60.

Described in more detail, the controller 60 changes the amount of light of the LED 63 by changing the ratio between the On and Off states of the switch 62 in the period of a predetermined frequency. In other words, by changing the duty ratio that is a ratio of a time during which the switch 62 is closed to one period, the amount of light of the LED 63 is changed.

For example, in a case where a current to the LED 63 is continuously shut off by continuously opening the switch 62 in one period, the duty ratio is 0%. On the other hand, in a case where a current continuously flows through the LED 63 by continuously closing the switch 62 in one period, the duty ratio is 100%. As above, in the PWM control process, by changing the opening/closing time of the switch 62 in one period, the duty ratio is changed, whereby a time during which the current flows through the LED 63 in one period is changed. Accordingly, the light emission time of the lighting LED 63 in one period is changed in accordance with the duty ratio.

The electric power supplied from the power supply 61 is supplied to an electrical circuit with a constant voltage regardless of the elapse of time. In a case where the PWM control process is performed, the PWM output is made only for a time according to the duty ratio in accordance with an elapse of time for each period of the PWM control process for an input from the power supply 61. Accordingly, the light emission time of the lighting LED 63 per unit time is changed in accordance with the duty ratio, and therefore, the amount of light per unit time is changed.

In the PWM control process, the amount of light of the lighting LED 63 is adjusted as above, and, also in the lighting device 3 included in the image capturing system 1 according to this embodiment, the control unit 40 performs driving control for adjusting the amount of light of the lighting LED 39 through the PWM control process. In other words, in a case where dimmer control of the lighting LED 39 is performed by depressing the lighting switch 37 for a long time in the state in which the lighting LED 39 is turned on, the amount of light is adjusted by changing the duty ratio of the PWM control process.

In addition, in the image capturing system 1 according to this embodiment, the lighting device 3 is used not only as a lighting stand, but, by setting the smartphone 2 in the lighting device 3, the medium 6 can be scanned by reading the medium 6 that is installed on the medium installation face 5 by using the smartphone 2. The scanning of the medium 6 in the image capturing system 1 will now be described. When the medium 6 is scanned, the smartphone 2 is mounted on the mounting face 34 of the top unit 33 so as to position the image capturing unit 21 of the smartphone 2 on the lower side in a direction in which the image capturing unit 21 is exposed from the top unit 33.

The smartphone 2 and the lighting device 3 are configured to transmit and receive information thereof by performing communication between the communication unit 22 of the smartphone 2 and the communication unit 45 of the lighting device 3. In addition, the smartphone 2 can perform a photographing operation in accordance with the reception of a control signal that is transmitted from the lighting device 3. In the image capturing system 1, the start of scanning is triggered upon the press of the scan switch 36. Accordingly, the smartphone 2 mounted in the top unit 33 of the lighting device 3 continues to wait for the reception of a scan start trigger transmitted from the lighting device 3 in the communication unit 22.

In this state, when the scan switch 36 of the lighting device 3 is depressed by the user, a scan start trigger is transmitted from the lighting device 3 to the smartphone 2. This scan start trigger is transmitted from the communication unit 45 of the lighting device 3 and is received by the communication unit 22 of the smartphone 2. The smartphone 2 that has received the scan start trigger starts the dimmer control of the lighting LED 39 that is included in the lighting device 3.

In other words, while the lighting LED 39 is controlled to the brightness level preferred by the user in accordance with an input manipulation for the lighting switch 37, the brightness level required in the photographing process performed by the smartphone 2 does not always match the brightness level preferred by the user. Accordingly, the smartphone 2 instructs the lighting device 3 such that the amount of light emitted from the lighting LED 39 is the maximum amount of light. In other words, a control signal for setting the amount of light of the lighting LED 39 to be a brightest level is transmitted from the communication unit 22 of the smartphone 2. The control unit 40 of the lighting device 3 that has received this control signal using the communication unit 45 sets the duty ratio of the PWM control process to 100% so as to cause the lighting LED 39 that has been turned on and off at high speed by the PWM control process to be in a constantly turned-on state, in other words, a turned-on state all the time, thereby setting the amount of light of the lighting LED 39 to be maximum.

The smartphone 2 photographs the image of the photographed area 7 in the state in which the amount of light of the lighting LED 39 is a maximum by using the image capturing unit 21 and photographs the image of the photographed area 7 on the medium installation face 5, thereby capturing the image of the medium 6 within the photographed area 7. Accordingly, the image capturing system 1 photographs the medium 6 in an optimal environment created by the lighting LED 39 that is a lamp included therein, thereby scanning the medium 6. The image acquired through this scanning is adjusted to have an appropriate image quality in the image processing performed by the image processing unit 23 included in the smartphone 2 and then is recorded to be stored in the recording unit 24.

Here, effects acquired by setting the duty ratio of the PWM control process to 100% other than the change in the amount of light will be described. The human eyes accumulate light arriving at retinas at a specific time interval and perceive the accumulated light as an image, whereby a lighting that is turned on and off at a high speed is recognized as averaged uniform light. In other words, the eyes of a person do not feel flickering of the light for which the PWM control process has been performed. On the other hand, since an electronic device such as the image capturing unit 21 of the smartphone 2 or a digital camera can perceive light at a speed higher than that of the human eyes, the turning on and off of light, by the PWM control process to adjust the amount of light, influences on the image. Particularly, in the case of a camera that forms a two-dimensional image by exposing each line and aligning one dimensional images thereof, the turning on and off of the light performed by the PWM control process on the front side generate dark portions and bright portions for each line, whereby interference fringes are generated.

On the contrary, in the image capturing system 1 according to this embodiment, since the duty ratio of the PWM control process at the time of an photographing process performed by the image capturing unit 21 of the smartphone 2 is set to 100%, the lighting LED 39 at the time of the photographing process emits light without being turned on and off. Accordingly, the image capturing unit 21 of the smartphone 2 that photographs the photographed area 7 using the light of the lighting LED 39 can photograph an image having no interference fringes. In the image capturing system 1 according to this embodiment, by setting the duty ratio of the PWM control process to 100% at the time of the photographing process performed by the image capturing unit 21, not only the brightness level of the photographed area 7 is set to a brightness level that is appropriate to the photographing process, but an image can be photographed using the image capturing unit 21 without generating interference fringes therein.

As above, after the medium 6 is scanned with the duty ratio of the PWM control process being set to 100%, the smartphone 2 instructs the lighting device 3 of the amount of light of the lighting LED 39 such that the brightness level of the emission range 8 of the lighting LED 39 is restored to the original brightness level, in other words, the brightness level before scanning. Accordingly, the image capturing system 1 emits light onto the emission range 8 again with the brightness level preferred by the user.

In addition, in consideration of a case in which the user intentionally desires to perform photographing with the lighting device 3 being turned off when the medium 6 is scanned, when the lighting LED 39 is turned off at a time point at which the scan switch 36 is depressed, scanning is performed without performing dimmer control of the lighting LED 39. In other words, when the lighting LED 39 is turned off at the time of performing scanning, the medium 6 is scanned without turning on the lighting LED 39.

Next, the control sequence of the image capturing system 1 that performs irradiation with an arbitrary brightness level and scans the medium 6 installed on the medium installation face 5, as described above, will be described. In the description presented below, the control sequence at the time of operating the lighting device 3 and the control sequence at the time of performing the operation of the smartphone 2 will be separately described.

Figure 7:
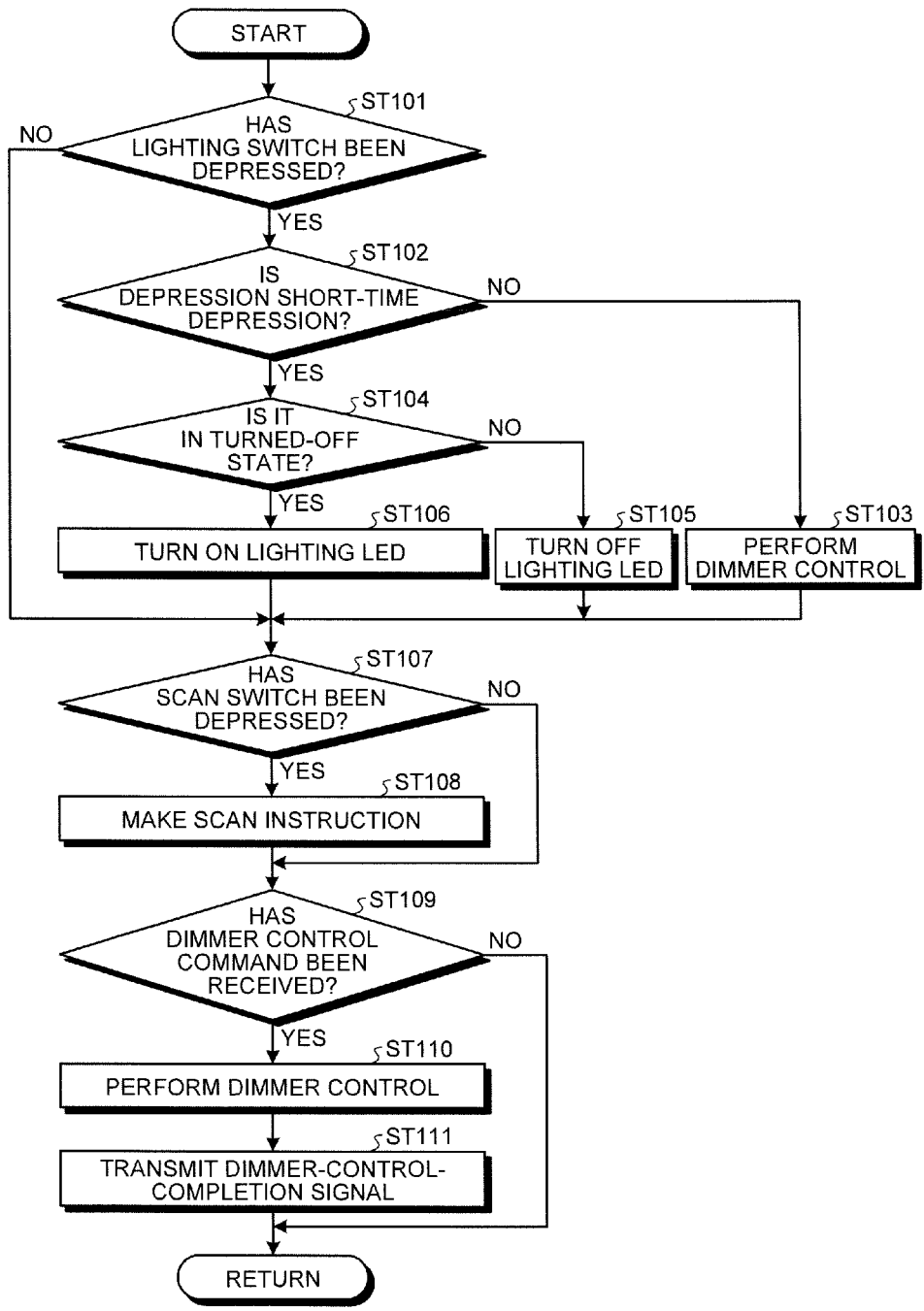
FIG. 7 is a flowchart illustrates a control sequence at the time of an operation of the lighting device included in the image capturing system illustrated in FIG. 1.

FIG. 7 is a flowchart illustrates the control sequence at the time of the operation of the lighting device included in the image capturing system illustrated in FIG. 1. The lighting device 3 of which the power switch 38 is turned on, first, determines whether or not the lighting switch 37 is depressed in Step ST101. The determination relating to the lighting switch 37 is performed by the control unit 40 based on the state of the lighting switch 37. According to the determination, in a case where the lighting switch 37 is determined to have been depressed (Yes in Step ST101), subsequently, it is determined whether or not the depression is a short-time depression in Step ST102.

According to this determination, in a case where the depression of the lighting switch 37 is determined not to be a short-time depression (No in Step ST102), in other words, in a case where it is determined that the lighting switch 37 has been depressed for a long time, dimmer control of the lighting LED 39 is performed by the LED driver 41 in Step ST103. In other words, during the depression of the lighting switch 37, a control process to increase and decrease the amount of light of the lighting LED 39 is repeatedly performed by increasing and decreasing the duty ratio of the PWM control process.

On the other hand, in a case where the depression of the lighting switch 37 is determined to be the short-time depression (Yes in Step ST102), subsequently, whether or not the lighting LED 39 is in the turned-off state is determined by the control unit 40 in Step ST104. According to this determination, in a case where the lighting LED 39 is determined not to be in the turned-off state (No in Step ST104), in other words, in a case where the lighting LED 39 is determined to be in the turned-on state, the lighting LED 39 is turned off in Step ST105. On the other hand, in a case where the lighting LED 39 is determined to be in the turned-off state (Yes in Step ST104), the lighting LED 39 is turned on in Step ST106.

As described above, after either of the steps of turning on the lighting LED 39 in Step ST106, turning off the lighting LED 39 in Step ST105, or performing the dimmer control of the lighting LED 63 in Step ST103 or, in a case where the lighting switch 37 is determined not to have been depressed according to the determination made in Step ST101 (No in Step ST101), subsequently, it is determined whether or not the scan switch 36 has been depressed in Step ST107. The determination relating to the scan switch 36 is made by the control unit 40 based on the state of the scan switch 36.

According to this determination, in a case where the scan switch 36 is determined to have been depressed (Yes in Step ST107), a scan instruction is made in Step ST108. In other words, an instruction signal indicating the execution of a scanning operation is transmitted to the smartphone 2 by using wireless communication performed by the communication unit 45.

When this scan instruction is made in Step ST108, or, in a case where the scan switch 36 is determined not to have been depressed (No in Step ST107), subsequently, it is determined whether or not a dimmer control command has been received in Step ST109. In other words, it is determined whether or not a command indicating the dimmer control of the amount of light of the lighting LED 39 has been received by the communication unit 45. According to this determination, in a case where the dimmer control command is determined not to have been received (No in Step ST109), the process exits from one cycle in this control sequence.

On the other hand, in a case where a dimmer control command is determined to have been received (Yes in Step ST109), the dimmer control of the lighting LED 39 is performed in Step ST110. For example, the dimmer control command is a command at the time of performing scanning, the duty ratio of the PWM control process at the time of adjusting the amount of light of the lighting LED 39 is set to 100%, whereby the amount of light of the lighting LED 39 is set to a maximum. On the other hand, in a case where the dimmer control command is a command after the completion of scanning, the duty ratio of the PWM control process at the time of adjusting the amount of light of the lighting LED 39 is returned to the duty ratio before scanning, whereby the amount of light of the lighting LED 39 is set to the amount of light before scanning.

After the dimmer control of the lighting LED 39 is performed, subsequently, a signal of completion of the dimmer control (hereinafter, dimmer-control-completion signal) is transmitted from the communication unit 45 to the smartphone 2 in Step ST111. When the dimmer-control-completion signal is transmitted, the process exits from one cycle of the control sequence. The lighting device 3 operates by repeating the cycle of such a control sequence.

Figure 8:
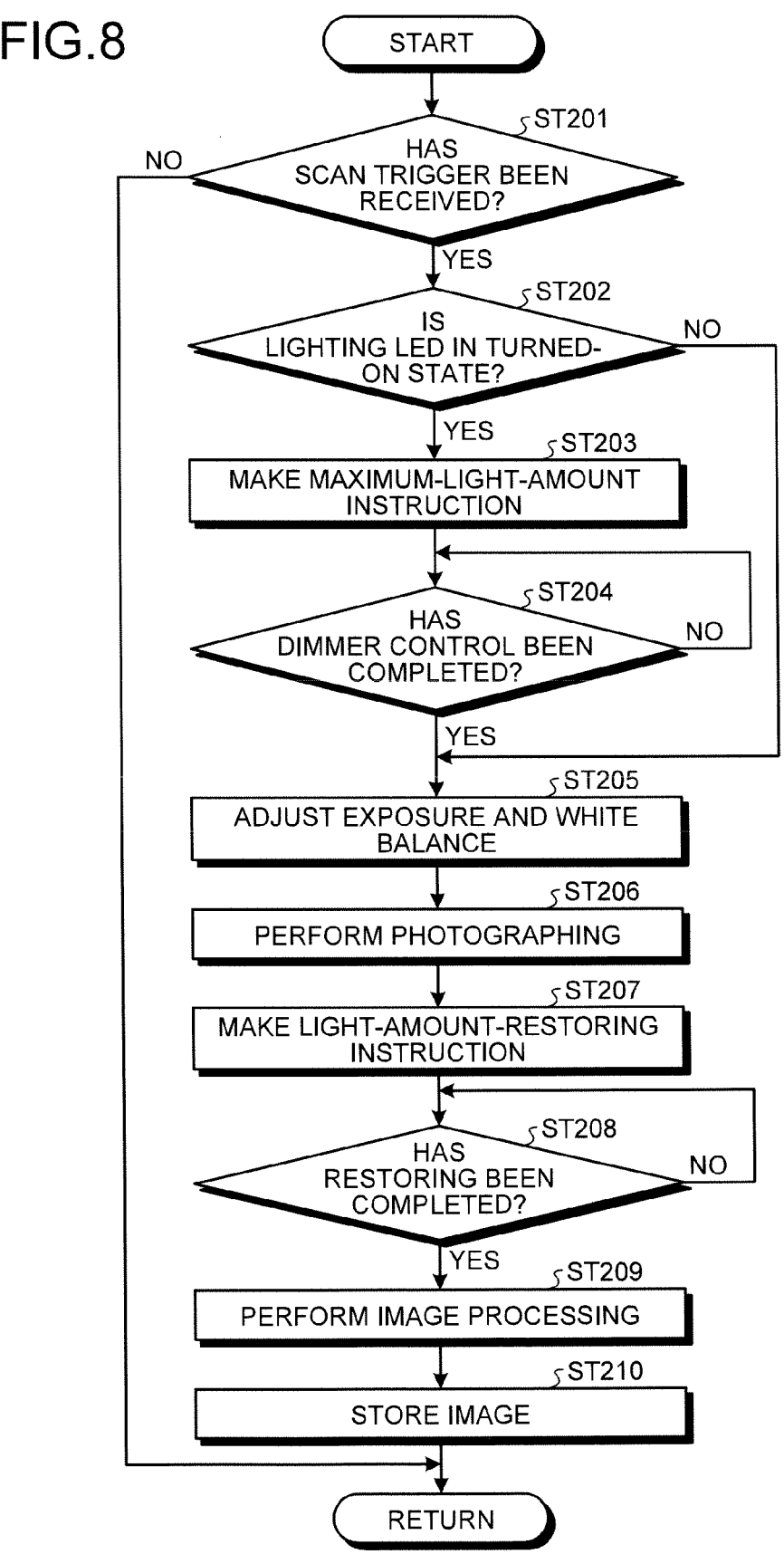
FIG. 8 is a flowchart that illustrates a control sequence at the time of the operation of a smartphone included in the image capturing system illustrated in FIG. 1.

FIG. 8 is a flowchart that illustrates a control sequence at the time of the operation of a smartphone included in the image capturing system illustrated in FIG. 1. First, the smartphone 2 determines whether or not a scan trigger transmitted from the lighting device 3 has been received by the communication unit 22 in Step ST201. Each determination in the smartphone 2 is made by the CPU 25. According to this determination, in a case where the scan trigger is determined not to have been received (No in Step ST201), the process exits from one cycle of this control sequence.

On the other hand, in a case where a scan trigger is determined to have been received (Yes in Step ST201), subsequently, it is determined whether or not the lighting LED 39 of the lighting device 3 is in the turned-on state in Step ST202. By this determination, the turned on/off state of the lighting LED 39 is determined by acquiring the operation state of the lighting device 3 by the smartphone 2 through wireless communication performed with the lighting device 3.

According to this determination, in a case where the lighting LED 39 of the lighting device 3 is determined to be in the turned-on state (Yes in Step ST202), an instruction of a maximum amount of light (hereinafter, maximum-light-amount instruction) is made in Step ST203. In other words, an instruction signal to set the amount of light of the lighting LED 39, which is in the turned-on state, to the maximum is transmitted to the lighting device 3 through wireless communication using the communication unit 22.

When the maximum-light-amount instruction is made, subsequently, it is determined whether or not dimmer control has been completed in Step ST204. When the dimmer control is completed, in order to transmit the signal of completion of the dimmer control (FIG. 7) in Step ST111, the lighting device 3 determines whether or not the dimmer control has been completed based on whether or not the dimmer-control-completion signal has been received. According to this determination, in a case where it is determined that the dimmer control has not been completed (No in Step ST204), the determination is repeated until the dimmer-control-completion signal is received.

On the other hand, in a case where the dimmer control is determined to have been completed (Yes in Step ST204), subsequently, the exposure or the white balance is adjusted in Step ST205. The adjustment is performed not only in a case where the dimmer control at the maximum amount of light is determined to have been completed (Yes in Step ST204) but also in a case where the lighting LED 39 of the lighting device 3 is determined not to be in the turned-on state (No in Step ST202). In other words, the exposure and the white balance are adjusted to be appropriate to the current photographing state of the photographed area 7 in the image capturing unit 21.

Next, the photographed area 7 is photographed using the image capturing unit 21 in Step ST206. Accordingly, the medium 6 that is installed to the photographed area 7 on the medium installation face 5 is photographed. When photographing is performed by the image capturing unit 21, subsequently, an instruction of restoring the amount of light (hereinafter, light-amount-restoring instruction) is made in Step ST207. In other words, an instruction of restoring the amount of light of the lighting LED 39, which is adjusted in accordance with a light amount instruction (Step ST203) transmitted from the smartphone 2, to the amount of light before the light amount instruction (Step ST203) is made by the smartphone 2 for the lighting device 3.

When the light-amount-restoring instruction is made, it is determined whether the restoring of the amount of the light of the lighting LED 39 has been completed in Step ST208. According to this determination, in a case where the restoring of the amount of the light is determined not to have been completed (No in Step ST208), the determination is repeated until the restoring of the amount of the light is determined to have been completed.

When the restoring of the amount of the light is determined to have been completed (Yes in Step ST208), subsequently, image processing is performed in Step ST209. For example, since the image capturing unit 21 photographs the medium 6 that is installed to the medium installation face 5 from the upper side of the inclination, image processing is performed by the image processing unit 23 such that image data acquired by photographing the medium 6 from the upper side of the inclination becomes an image acquired by photographing the medium 6 from the upper side in the vertical direction.

When this image processing is completed, an image after the image processing is stored in the recording unit 24 in Step ST210. When the image after the image processing is stored, the process exits from one cycle of the control sequence. The smartphone 2 operates by repeating the cycle of such control sequence, and the image capturing system 1 scans the medium 6 that is installed on the medium installation face 5 by cooperatively operating the smartphone 2 and the lighting device 3 and stores the acquired image in the smartphone 2.

When the medium 6 is scanned, control is performed with the smartphone 2 and the lighting device 3 operating in cooperation with each other as above. Subsequently, as above, the transition of control between the smartphone 2 and the lighting device 3 for which the control process advances in cooperation with each other will be described.

FIG. 9 is a control transition diagram between the lighting device and the smartphone at the time of scanning a medium. In the scanning of the medium 6, first, by depressing the scan switch 36 of the lighting device 3, an operation for scanning is started in Step ST301. The depressing of the scan switch 36 is transmitted to the smartphone 2 as a scan trigger. The smartphone 2 that has received the scan trigger makes the maximum-light-amount instruction for the lighting device 3 in Step ST401.

The lighting device 3 that has received a dimmer control command at the maximum amount of light sets the duty ratio of the PWM control process to 100%, thereby performing dimmer control such that the amount of light of the lighting LED 39 is the maximum amount of light in Step ST302. When the dimmer control of the lighting LED 39 is completed, the lighting device 3 transmits the dimmer-control-completion signal to the smartphone 2 in Step ST303.

When the dimmer-control-completion signal is received by the smartphone 2, the smartphone 2 adjusts the exposure and the white balance to be appropriate to the current photographing state of the photographed area 7, which is irradiated with emission light emitted from the lighting LED 39 at the maximum amount of light in Step ST402. When the exposure and the white balance are adjusted, the smartphone 2 photographs the image of the medium 6 using the image capturing unit 21 in Step ST403. When the photographing is completed, the smartphone 2 makes the light-amount-restoring instruction for the lighting device 3 in Step ST404.

The lighting device 3, which has received a dimmer control command of the light-amount-restoring instruction, sets the duty ratio of the PWM control process to the duty ratio before the depression of the scan switch 36 and performs dimmer control such that the amount of light of the lighting LED 39 is the amount of light before the depression of the scan switch 36 in Step ST304. When the dimmer control of the lighting LED 39 is completed, the lighting device 3 transmits the dimmer-control-completion signal to the smartphone 2 in Step ST305.

Accordingly, the image capturing system 1 performs photographing with the amount of light of the lighting LED 39 being set to an amount of light appropriate to the photographing in the image capturing unit 21 at the time of scanning the medium 6 while waiting in the state of being usable as a lighting stand.

The lighting device 3 according to the embodiment described above sets the amount of light of the lighting LED 39 to be maximum at the time of photographing the medium 6 and thus can perform photographing with a brightness level that is appropriate to the photographing. In addition, after the photographing, the amount of the light of the lighting LED 39 is returned to the amount of light before the photographing, and accordingly, the brightness level of the emission range 8 can be set to a brightness level of a user's taste. As a result, an optimal image can be acquired at the time of photographing, and the function of the lighting device 3 as a lighting stand can be maintained at the other time.

In addition, the control unit 40 of the lighting device 3 sets the duty ratio of the PWM control process at the time of adjusting the amount of light of the lighting LED 39 to 100% when the medium 6 is imaged and, accordingly, can suppress interference fringes in the image that are generated due to turning on and off of the lighting LED 39 according to the PWM control process. As a result, an optimal image can be more reliably acquired.

Furthermore, since the image capturing system 1 according to the embodiment is equipped with the lighting device 3 and the smartphone 2 that photographs the medium 6, in a case where the medium 6 is imaged by the smartphone 2, the photographing can be performed with a brightness level that is appropriate to the photographing and can set a brightness level of a user's taste after the photographing. As a result, an optimal image can be acquired at the time of photographing, and the function as a lighting stand can be maintained at the other time.

In addition, according to the lighting control method of the embodiment, the amount of light of the lighting LED 39 is set to the maximum when photographing is performed by the smartphone 2, and accordingly, the photographing can be performed with a brightness level that is appropriate to the photographing process. Furthermore, after the photographing process, the amount of light of the lighting LED 39 is returned to the amount of light before the photographing process, and accordingly, the brightness level can be set to a brightness level of a user's taste after the photographing process. As a result, an optimal image can be acquired at the time of the photographing process, and the function as a lighting stand can be maintained at the other time.

MODIFIED EXAMPLE

While the above-described image capturing system 1 performs driving control for adjusting the amount of light of the lighting LED 39 through the PWM control process, the adjustment of the light of the lighting LED 39 may be performed through a process other than the PWM control process. The adjustment of the amount of the light of the lighting LED 39 may be performed through an analog control process for adjusting a current in accordance with a target amount of light. Also in a case where the adjustment of the amount of the light of the lighting LED 39 is performed through the analog control process, in a case where the lighting device 3 is used as a lighting stand, the current flowing through the lighting LED 39 is adjusted in accordance with the brightness level of a user's taste, and, at the time of scanning the medium 6, the amount of the light of the lighting LED 39 is set to the maximum by allowing a maximum current to flow through the lighting LED 39, whereby an optimal image can be acquired.

In addition, in the above-described image capturing system 1, in order to prevent interference fringes generated at the time of the photographing process performed in the smartphone 2 by using the emission light emitted from the lighting LED 39 for which the PWM control process is performed, while the duty ratio of the PWM control process at the time of the photographing process is set to 100%, the suppression of interference fringes may be performed using any other technique. For example, when a PWM frequency that is the frequency of the PWM control process is set to a frequency that is sufficiently higher than the exposure frequency of the smartphone 2, reduction of the interference fringes in the image may be achieved. As the PWM frequency of such a case, a value acquired by multiplying a pixel gray scale by the exposure frequency is appropriate. For example, when the exposure frequency of the smartphone 2 is 1 kHz, and the pixel is represented in 8 bits (256 gray scales), it is preferable that the PWM frequency be 256 kHz or more. As above, by setting the PWM frequency to a frequency that is sufficiently higher than the exposure frequency of the smartphone 2 instead of setting the duty ratio of the PWM control process to 100%, the interference fringes in the image can be reduced.

Furthermore, in the above-described image capturing system 1, while the image data acquired by performing the photographing process using the smartphone 2 is stored in the recording unit 24 of the smartphone 2, the image data may be stored in a unit other than the smartphone 2. For example, when photographing is performed by the smartphone 2, the image data may be transmitted to the lighting device 3 and stored in the lighting device 3. Alternatively, the image data may be transmitted to an external server and stored in the external server.

In addition, while the above-described image capturing system 1 can adjust the brightness level to a desired brightness level in a case where the lighting device 3 is used as a lighting stand, the brightness level in a case where the image capturing system is used as a lighting stand may be configured to be constant. In other words, the amount of light emitted by the lighting LED 39 may be configured to have two levels as the amount of light at the time of using the lighting device 3 as a lighting stand and the amount of light at the time of scanning the medium 6. In such a case, the amount of light of the lighting LED 39 at the time of scanning the medium 6 is set to the maximum amount of light, and the amount of light at the time of using the lighting device 3 as a lighting stand is set to an amount of light that corresponds to a brightness level at which the user does not feel the glare thereof. By configuring the amount of light to have two levels as above, normally, the amount of light is set to the amount of light at the time of using the lighting device as a lighting stand, the amount of light is set to the maximum amount of light only at the time of scanning the medium 6, and the amount of light is returned to the original amount of light when the scanning is completed. Accordingly, an optimal image can be acquired at the time of the photographing process, and the function of the lighting device 3 as a lighting stand can be maintained at the other time.

Furthermore, in the above-described image capturing system 1, while the smartphone 2 is used as an image capturing unit that photographs the medium 6 installed to the medium installation face 5, any unit other than the smartphone 2 may be used as the image capturing unit. As the image capturing unit, for example, a digital camera having a function for communicating with the lighting device 3 may be used. The form of the image capturing unit is not limited as long as it can perform a photographing process based on a scan trigger transmitted from the lighting device 3 by communicating with the lighting device 3.

The lighting device, the image capturing system, and the lighting control method according to the present invention have an advantage of being capable of acquiring an optimal image at the time of capturing an image and maintaining the function as a lighting device at the other time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lighting device comprising:
   a base unit arranged on a medium installation face on which a medium that is a reading target is disposed;
   an arm unit extending upwardly from the base unit;
   a top unit extending from the arm unit so as to face the medium installation face;
   a mounting face disposed on the top unit to mount an image capturing unit at a position for photographing the medium disposed on the medium installation face, the image capturing unit including a first communication unit to perform wireless communication;
   a lighting disposed in the top unit to irradiate the medium installation face;
   a lighting control unit configured to perform driving control to adjust an amount of light of the lighting;
   a second communication unit arranged in the lighting device, the second communication unit configured to perform wireless communication with the first communication unit, and
   a scan switch disposed on the base unit, the scan switch generating a scan start trigger to be transmitted to the image capturing unit through the second communication unit and the first communication unit,
   wherein the image capturing unit is configured to determine whether or not the lighting is in a turned-on state subsequent to receiving the scan start trigger, and when the lighting is determined to be in the turned-on state, the image capturing unit instructs the lighting control unit to set the amount of light of the lighting to a maximum at the time of photographing and, after the photographing, the image capturing unit instructs the lighting control unit to return the amount of light of the lighting to the amount of light before the photographing, and
   when the lighting is determined to be in the turned-off state subsequent to receiving the scan start trigger, the image capturing unit perform photographing without turning on the lighting.

2. The lighting device according to claim 1,
   wherein the driving control is pulse width modulation (PWM) control, and
   wherein the lighting control unit sets a duty ratio of the PWM control to 100% at the time of the photographing.

3. An image capturing system comprising:
   an image capturing unit configured to photograph a medium; and
   a lighting device including
   a base unit arranged on a medium installation face on which the medium that is a reading target is disposed,
   an arm unit extending upwardly from the base unit,
   a top unit extending from the arm unit so as to face the medium installation face,
   a mounting face disposed on the top unit to mount the image capturing unit at a position for photographing the medium disposed on the medium installation face,
   a lighting disposed in the top unit to irradiate the medium installation face,
   a lighting control unit configured to perform driving control to adjust an amount of light of the lighting,
   a second communication unit arranged in the lighting device, the second communication unit configured to perform wireless communication with the first communication unit, and
   a scan switch disposed on the base unit, the scan switch generating a scan start trigger to be transmitted to the image capturing unit through the second communication unit and the first communication unit,
   wherein the image capturing unit is configured to determine whether or not the lighting is in a turned-on state subsequent to receiving the scan start trigger, and when the lighting is determined to be in the turned-on state, the image capturing unit instructs the lighting control unit to set the amount of light of the lighting to a maximum at the time of photographing and, after the photographing, the image capturing unit instructs the lighting control unit to return the amount of light of the lighting to the amount of light before the photographing, and when the lighting is determined to be in the turned-off state subsequent to receiving the scan start trigger, the image capturing unit perform photographing without turning on the lighting.

4. A method of controlling lighting of a lighting device including a base unit arranged on a medium installation face on which a medium that is a reading target is disposed, an arm unit extending upwardly from the base unit, a top unit extending from the arm unit so as to face the medium installation face, a mounting face disposed on the top unit to mount an image capturing unit at a position for photographing the medium disposed on the medium installation face, the image capturing unit including a first communication unit to perform wireless communication, a lighting disposed in the top unit to irradiate the medium installation face, and a second communication unit arranged in the lighting device, the second communication unit configured to perform wireless communication with the first communication unit, a scan switch generating a scan start trigger to be transmitted to the image capturing unit through the second communication unit and the first communication unit, the method comprising:

irradiating the medium installation face with an amount of light of the lighting;

receiving the scan target trigger;

determining whether or not the lighting is in a turned-on state at the image capturing unit subsequent to receiving the scan start trigger;

when it is determined that the lighting is in the turned-on state subsequent to receiving the scan start trigger, instructing from the image capturing unit to set the amount of light of the lighting to a maximum at the time of photographing; and after the photographing, instructing from the image capturing unit to return the amount of light of the lighting to the amount of light before the photographing, and when it is determined that the lighting is in turned-off state subsequent to receiving the scan start trigger, performing photographing without turning on the lighting.

\* \* \* \* \*